United States Patent Office 3,301,836
Patented Jan. 31, 1967

3,301,836
ORGANO-BORON COPOLYMERS
Joseph Green and Nathan Mayes, Dover, N.J., assignors to Thiokol Chemical Corporation, Bristol, Pa., a corporation of Delaware
No Drawing. Filed Oct. 21, 1960, Ser. No. 64,214
7 Claims. (Cl. 260—86.1)

This invention relates to organoboron copolymers and to a method for their preparation. The organoboron copolymers are prepared by the reaction of a lower alkanol ester of acrylic acid or methacrylic acid with a compound of the class $$R-C=C-R'$$
$$| \quad |$$
$$B_{10}H_{10-n}$$
$$|$$
$$R''_n$$

wherein R and R' are each hydrogen, alkyl radicals, or alkenyl radicals, at least one of R and R' being an alkenyl radical and the total number of carbon atoms in R and R' being from 2 to 8, R'' is a lower alkyl radical, and $n$ varies from 0 to 4 while the reactants are in admixture with a catalytic amount of an initiator for vinyl-type polymerizations.

Compounds of the above class can be prepared by the method described in application Serial No. 59,460, filed September 29, 1960, of Jack Bobinski et al. For example, C-isopropenylvinylenedecaborane of the formula

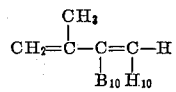

can be prepared by heating isopropenyl acetylene with bis(acetonitrilo)decaborane in benzene at reflux for 24 hours.

Suitable esters include methylacrylate, ethylacrylate n-propyl acrylate, methyl methacrylate and ethyl methacrylate.

The free-radical initiators for vinyl-type polymerizations are well known and include the organic peroxide type and the azo type. Thus there can be employed in the process of the present invention organic peroxides such as for example, acetyl benzoyl peroxide, peracetic acid, hydroxyheptyl peroxide, isopropyl percarbonate, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, methyl cyclohexyl hydroperoxide, t-butyl permaleic acid, t-butyl perbenzoate, di-t-butyl diperphthalate, t-butyl perphthalic acid, p-chlorobenzoyl peroxide, t-butyl peroxide, dibenzal diperoxide and azo compounds such as, for example, azobisisobutyronitrile, azobisphenylethane, p-bromobenzenediazo hydroxide, triphenylmethylazobenzene and diazoaminobenzene. Other suitable free-radical initiators for vinyl-type polymerization include N-nitrosoacylanilides and benzyl hyponitrite.

The ratio of reactants can be varied widely, generally being in the range of 0.5 to 2 moles of ester per mole of organoboron compound, preferably 1 to 1. The ratio of initiator to organoboron compund can also be varied widely, generally being in the range of 0.001 to 0.10 mole of initiator per mole of organoboron compound, preferably 1 to 100. The reaction temperature can vary from 25° C. to 150° C. and the pressure can vary from subatmospheric to several atmospheres. The reaction to go to completion generally requires about 24 to 72 hours depending upon the ratio of reactants, the particular reactants and initiator used, and the temperature and pressure employed.

The process of the invention is illustrated in detail by the following examples.

Example I 1.0 gram (0.005 mole) of C-isopropenylvinylene-decaborane of the formula

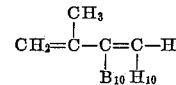

1.6 gram (0.02 mole) of methylacrylate, and about 0.015 gram of azobisisobutyronitrile were heated in an evacuated sealed glass tube at 75–80° C. for 20 hours. The liquid contents became increasingly more viscous. The seal was broken and the viscous liquid was dissolved in about 10 ml. of methyl ethyl ketone which was added dropwise with stirring to about 50 ml. of n-pentane. The sticky rubbery polymer that precipitated was again dissolved in about 10 ml. of methyl ethyl ketone and reprecipitated in about 100 ml. of n-pentane. After removal of volatile impurities by heating at 70° C. in vacuo for 64 hours, the polymer was a solid that was rubbery between 45 and 80° C. and flowed at temperatures greater than 80° C. The polymer analyzed for 10.5% B and the infrared spectrum showed absorptions for BH, trace C=C, and an ester similar to but not the same as methylacrylate.

Example II 1.0 gram (0.005 mole) of C-isopropenylvinylene-decaborane of the formula

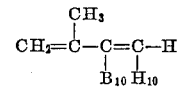

0.425 gram (0.005 mole) of methylacrylate and 0.015 gram of azobisisobutyronitrile were heated in an evacuated sealed glass tube at 75–80° C. for 42 hours. The seal was broken and the viscous liquid contents were dissolved in 10 ml. of benzene which was added dropwise with stirring to 50 ml. of petroleum ether. The solid precipitate was collected and again dissolved in 10 ml. of benzene and precipitated in 50 ml. of petroleum ether. The polymer softened at about 80° C. and analyzed for 21.86% B. The infrared spectrum was similar to that of Example I.

The boron containing solid materials produced by practicing the methods of this invention, can be employed as ingredients of solid propellant compositions in accordance with general procedures which are well understood in the art, inasmuch as the solids produced are readily oxidized using conventional solid oxidizers such as ammonium perchlorate, potassium perchlorate, sodium perchlorate and the like. In formulating a solid propellant composition employing one of the materials produced in accordance with the present invention, generally from 5 to 35 parts by weight of the boron containing material and from 65 to 95 parts by weight of oxidizer are present in the final propellant composition. In the propellant, the oxidizer and the product of the present process are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin generally of the urea-formaldehyde or phenolformaldehyde type, the function of the resin being to give the propellant mechanical strength and at the same time improve its burning characteristics. Thus, in manufacturing a suitable propellant, proper proportions of finely divided oxidizer and finely divided boron containing material can be admixed with a high solids content solution of partially condensed urea-formaldehyde or phenol-formaldehyde resin, the proportions being such that the amount of resin is about 5 to 10 percent by weight based on the weight of oxidizer and boron compound. The ingredients are thoroughly mixed with the simultaneous removal of solvent, and following this the solvent free mixture is molded into the desired shaped, as by extrusion. Thereafter the resin can be cured by resorting to heating at moderate temperatures. For further information concerning the formulation of solid propellant compositions, a reference is made to U.S. Patent 2,622,277 to Bonnell and U.S. Patent 2,646,596 to Thomas.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets, and shapes, all wtih desirable mechanical and chemical properties. Propellants produced by the methods described in this application burn uniformly with disintegration when ignited by conventional means, such as a pyrotechnic type igniter, and are mechanically strong enough to withstand ordinary handling.

We claim:

1. A method for the preparation of organoboron copolymers which comprises reacting a lower alkanol ester of an acid selected from the group consisting of acrylic acid and methacrylic acid with a compound of the class

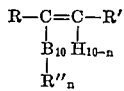

wherein R and R' are each selected from the class consisting of hydrogen, alkyl radicals and alkenyl radicals, at least one of R and R' being an alkenyl radical and the total number of carbon atoms in R and R' being from 2 to 8, R'' is a lower alkyl radical, and $n$ varies from 0 to 4, while the reactants are in admixture with a catalytic amount of an initiator for vinyl-type polymerizations.

2. The method of claim 1 wherein the ester is methylacrylate.

3. The method of claim 1 wherein the said compound is C-isopropenylvinylenedecaborane of the formula

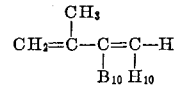

4. The method of claim 1 wherein the initiator is azobisisobutyronitrile.

5. The method of claim 1 wherein the ester is methylacrylate, wherein the said compound is C-isopropenylvinylenedecaborane of the formula

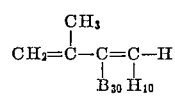

and wherein the initiator is azobisisobutyronitrile.

6. Organoboron copolymers produced by the method of claim 1.

7. Organoboron copolymers produced by the method of claim 5.

References Cited by the Examiner

UNITED STATES PATENTS 3,203,979    8/1965    Ager et al. _____ 149—22

JOSEPH L. SCHOFER, *Primary Examiner.*

ROGER CAMPBELL, *Examiner.*

LEON ROSDOL, BENJAMIN R. PADGETT, J. W. WHISLER, L. A. SEBASTIAN, *Assistant Examiners.*